US009015455B2

(12) United States Patent
Held et al.

(10) Patent No.: US 9,015,455 B2
(45) Date of Patent: Apr. 21, 2015

(54) PROCESSSOR INTEGRAL TECHNOLOGIES FOR BIOS FLASH ATTACK PROTECTION AND NOTIFICATION

(75) Inventors: James P. Held, Portland, OR (US); Scott H. Robinson, Portland, OR (US); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 859 days.

(21) Appl. No.: 13/178,338

(22) Filed: Jul. 7, 2011

(65) Prior Publication Data

US 2013/0013905 A1  Jan. 10, 2013

(51) Int. Cl.
*G06F 9/00* (2006.01)
*G06F 21/57* (2013.01)
*G06F 9/44* (2006.01)

(52) U.S. Cl.
CPC ............ *G06F 21/575* (2013.01); *G06F 9/4401* (2013.01)

(58) Field of Classification Search
CPC ..... G06F 9/4403; G06F 9/445; G06F 21/572; G06F 21/575; G06F 21/00
USPC ...................................... 713/1, 2; 726/22, 23
See application file for complete search history.

(56) References Cited

U.S. PATENT DOCUMENTS

| | | | |
|---|---|---|---|
| 6,401,208 B2 * | 6/2002 | Davis et al. | 713/193 |
| 6,591,362 B1 * | 7/2003 | Li | 713/1 |
| 6,711,675 B1 | 3/2004 | Spiegel et al. | |
| 7,269,747 B2 | 9/2007 | Catherman et al. | |
| 7,546,447 B2 * | 6/2009 | Chen et al. | 713/1 |
| 7,593,900 B2 * | 9/2009 | Okabayashi et al. | 705/41 |
| 7,840,837 B2 | 11/2010 | Totolos et al. | |
| 8,041,794 B2 | 10/2011 | Kohn et al. | |
| 8,490,189 B2 * | 7/2013 | Prakash et al. | 726/22 |
| 8,555,049 B2 | 10/2013 | Takayama et al. | |
| 8,893,112 B2 | 11/2014 | Khosravi et al. | |
| 2003/0056107 A1 | 3/2003 | Cammack et al. | |

(Continued)

FOREIGN PATENT DOCUMENTS

| | | |
|---|---|---|
| JP | 2006-106914 | 4/2006 |
| JP | 2009-169841 | 7/2009 |

OTHER PUBLICATIONS

Cooper, et al., "BIOS Protection Guidelines, Recommendations of the National Institute of Standards and Technology," NIST Special Publication 800-147, Apr. 2011, 26 pages.

(Continued)

*Primary Examiner* — Chun Cao
(74) *Attorney, Agent, or Firm* — Grossman, Tucker, Perreault & Pfleger, PLLC

(57) ABSTRACT

A system and method for BIOS flash attack protection and notification. A processor initialization module, including initialization firmware verification module may be configured to execute first in response to a power on and/or reset and to verify initialization firmware stored in non-volatile memory in a processor package. The initialization firmware is configured to verify the BIOS. If the verification of the initialization firmware and/or the BIOS fails, the system is configured to select at least one of a plurality of responses including, but not limited to, preventing the BIOS from executing, initiating recovery, reporting the verification failure, halting, shutting down and/or allowing the BIOS to execute and an operating system (OS) to boot in a limited functionality mode.

18 Claims, 5 Drawing Sheets

(56) References Cited

U.S. PATENT DOCUMENTS

| | | | |
|---|---|---|---|
| 2006/0101310 A1 | 5/2006 | Diamant et al. | |
| 2006/0107328 A1 | 5/2006 | Frank et al. | |
| 2007/0088943 A1 | 4/2007 | Phelps et al. | |
| 2007/0143583 A1 | 6/2007 | Cors et al. | |
| 2008/0256363 A1* | 10/2008 | Balacheff et al. | 713/187 |
| 2009/0172639 A1* | 7/2009 | Natu et al. | 717/120 |
| 2009/0327684 A1* | 12/2009 | Zimmer et al. | 713/2 |
| 2012/0266259 A1* | 10/2012 | Lewis | 726/30 |

OTHER PUBLICATIONS

International Search Report and Written Opinion from related case PCT/US12/04551 mailed Nov. 28, 012, 9 pages.

International Preliminary Report on Patentability received for PCT Patent Application No. PCT/US2012/045551, mailed on Jan. 16, 2014, 6 pages.

Office Action received for Japanese Patent Application No. 2014-519289, mailed on Dec. 16, 2014, 3 pages of English Translation and 3 pages of Japanese Office Action.

* cited by examiner

PROCESSSOR INTEGRAL TECHNOLOGIES FOR BIOS FLASH ATTACK PROTECTION AND NOTIFICATION

FIELD

The present disclosure relates to BIOS protection, and, more particularly, to BIOS flash attack protection and notification.

BACKGROUND

Computing devices, personal computers, workstations, and servers (hereinafter "computer" or "computers") typically include a basic input and output system (BIOS) as an interface between computer hardware (e.g., a processor, chipsets, memory, etc.) and an operating system (OS). The BIOS includes firmware and/or software code to initialize and enable low-level hardware services of the computer, such as basic keyboard, video, disk drive, input/output (I/O) port(s), and chipset drivers (e.g., memory controllers) associated with a computer motherboard.

The initialization and configuration of a computer system by firmware, such as Basic Input/Output System (BIOS), occur during a pre-boot phase. After a reset, a processor refers to a predetermined address which is mapped to a non-volatile storage device storing BIOS firmware. The processor sequentially fetches BIOS instructions. These instructions typically cause the computer to initialize its electronic hardware, initialize its peripheral devices, and boot an operating system. Unified Extensible Firmware Interface (UEFI) is a modern BIOS firmware architecture that includes several phases, e.g., security phase (SEC), platform environmental initialization (PEI), driver execution environment (DXE) phase, and boot device select (BDS) phase.

Methods of compromising platform firmware are continually being developed. Compromising platform firmware enables an arsenal of tools to attack a system. Unlike software attacks, compromised firmware is hard to detect and recovery is difficult. Compromised firmware is generally invisible to the software layer of a system, including most anti-virus and spyware tools. The invisible and persistent nature of firmware makes it ideal for malicious rootkits. Rootkits are compact and dormant malicious hooks in the platform that attain highest possible privilege and lowest visibility to running software. Their primary function is to deliver an attack or provide an API to other viruses and worms on an infected system.

BIOS is typically stored in flash memory to allow re-programmability. Programming may then be performed without jumper changes for form factor and end-user convenience reasons. This re-programmability results in a vulnerability to attack by unauthorized persons and/or malware. Vulnerabilities in BIOS may also be exploited. Through access to the system BIOS, a rootkit may be installed that survives system reboot. Anti-virus software may be unable to reliably detect this "persistent" rootkit.

In some situations, BIOS may be stored in true ROM, preventing re-programmability. However, BIOS updates and other legitimate modifications may be necessary that may be implemented only through physical access to the system and the ROM that stores the BIOS.

BRIEF DESCRIPTION OF DRAWINGS

Features and advantages of the claimed subject matter will be apparent from the following detailed description of embodiments consistent therewith, which description should be considered with reference to the accompanying drawings, wherein:

Figure 1:
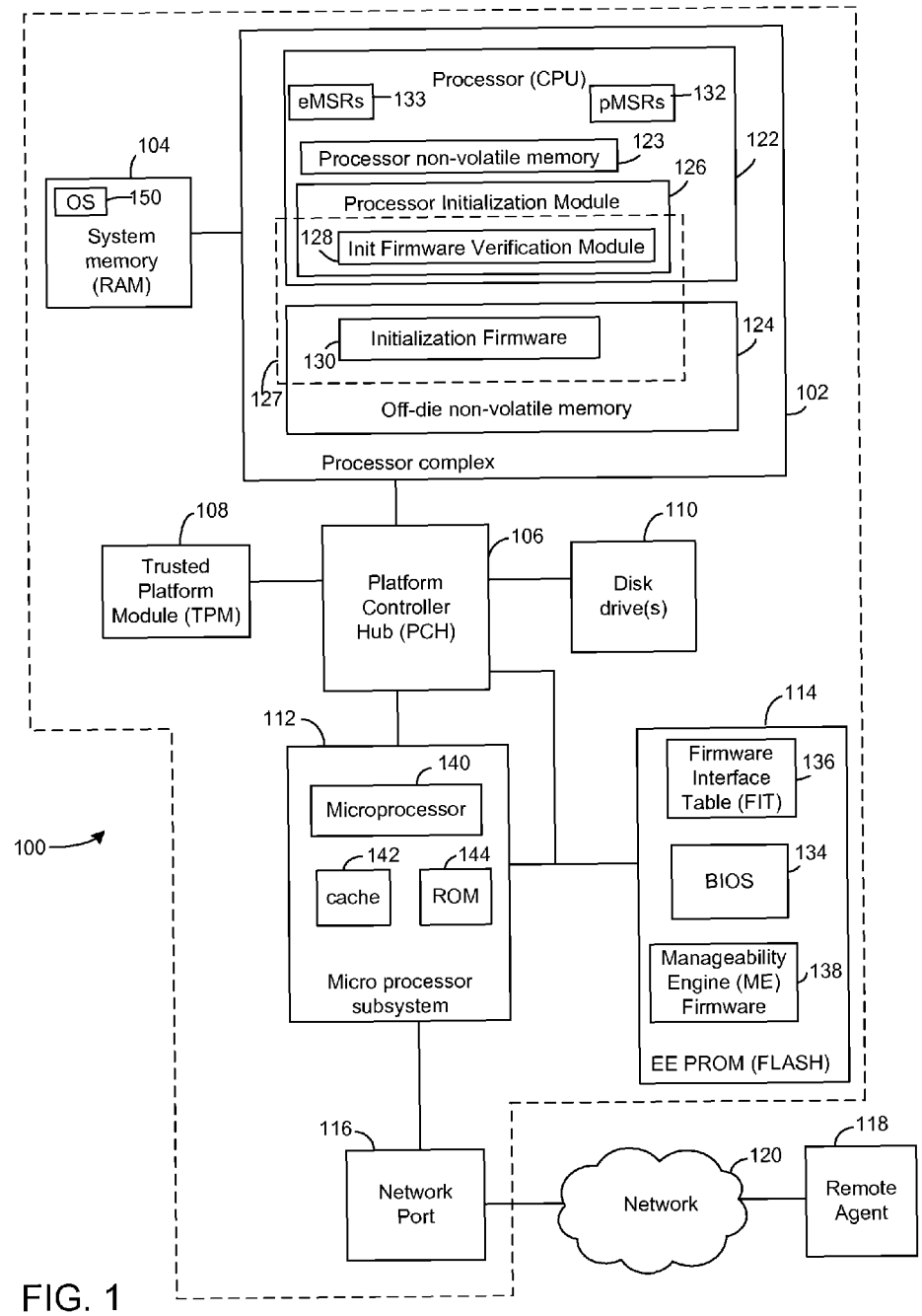
FIG. 1 illustrates a system (computing platform) consistent with various embodiments of the present disclosure.

Although the following Detailed Description will proceed with reference being made to illustrative embodiments, many alternatives, modifications, and variations thereof will be apparent to those skilled in the art.

DETAILED DESCRIPTION

Generally, this disclosure provides systems (and methods) for BIOS storage attack protection and notification. One example system (computing platform) includes a processor complex that includes a processor and off-die non-volatile memory, coupled to the processor. The processor includes a processor initialization module and may include volatile and non-volatile memory. The processor initialization module includes an initialization firmware verification module and the processor complex includes initialization firmware. The initialization firmware may be written in the Instruction Set Architecture (ISA) of the processor and may be stored in the off-die non-volatile memory.

The processor initialization module is configured to be executed first in response to a reset in order to carry out internal initialization of the processor. The reset may be triggered by power on and/or a state of a model specific register. As used herein, a "reset" is a restart event where flow control is returned to the processor initialization module. Reset includes a power-on-reset where the electrical components of a system have had power removed prior to the restart. Memory contents may or may not have been saved for subsequent restoration. Reset further includes a CPU-only reset where power is maintained to the electrical components of a system.

The initialization firmware verification module is configured, as part of the processor initialization module, to verify (i.e., attempt to verify or authenticate) the initialization firmware. The processor initialization module and/or the initialization firmware verification module may include microcode, circuitry and/or state information stored in processor volatile and/or non-volatile memory. The initialization firmware is configured to be executed after the initialization firmware verification module and is configured to verify (i.e., attempt to verify) the BIOS. The initialization firmware may be in the processor ISA or an internal format. If the verification of the initialization firmware and/or the BIOS fails, the system is configured to initiate one or more response(s). Responses include but are not limited to: preventing the initialization firmware and/or BIOS from executing, initiating recovery (e.g., using out-of-band (OOB) communication), reporting the verification failure using a model-specific register (MSR), halting, shutting down, and/or configuring the computing platform for operation in "quarantine mode", allowing the BIOS to execute and an operating system (OS) to boot. In the quarantine mode, some functionality of the system may be made unavailable to the BIOS and OS.

Advantageously, the processor initialization module, initialization firmware verification module and initialization firmware are integral to the processor package and are typically unavailable to parties other than the processor manufacturer. The initialization firmware provenance and authenticity may be guaranteed by the processor complex, and the initialization firmware may run in an isolated execution mode that may include partitioned memory. Unlike a UEFI BIOS, the internal processor initialization/reset and firmware interfaces may not be made generally available. Allowing operation in the quarantine mode provides limited operation when the BIOS verification fails rather than preventing operation entirely. The BIOS verification failure may then be communicated to a user. For example, the BIOS may be updated locally, using, e.g., physical jumper settings on the motherboard. In another example, the BIOS may be updated over a network using OOB communication with a remote agent.

System Architecture

FIG. 1 illustrates a system consistent with various embodiments of the present disclosure. The system 100 of FIG. 1 may include a processor complex 102, system memory (RAM) 104 (including OS 150), a platform controller hub (PCH) 106, a trusted platform module (TPM) 108, one or more disk drive(s) 110, a microprocessor subsystem 112, EEPROM 114 and a network port 116. The system 100 may be coupled to a remote agent 118 via a network 120, and network port 116. Although shown as a separate block, in some embodiments, TPM 108 may be included in microprocessor subsystem 112.

As a general overview of system 100, the processor complex 102 is configured to execute a processor initialization module 126, including an initialization firmware verification module 128, and may execute initialization firmware 130, in response to a system reset, e.g., in response to a power on of the system and/or state of a model-specific register (MSR). The processor initialization module 126 and initialization firmware verification module 128 may be implemented in microcode and/or circuitry. The initialization firmware verification module 128 is configured to verify the initialization firmware 130 and the initialization firmware 130 is configured to verify the BIOS. The initialization firmware verification module 128 may be included on-die (i.e., on the processor 122 die) and/or on-package (i.e., in the processor complex 102). For example, dedicated state machines and/or embedded (subordinate) controllers may aid and/or conduct verification activities. Such dedicated state machines and/or embedded controllers may be included in the processor complex 102. For example, the initialization firmware 130 may perform a cryptographic integrity check on a cryptographically signed BIOS in order the implement a verified boot. If the BIOS verification fails then the processor complex 102 is configured to initiate one or more responses. The responses include, but are not limited to, limiting BIOS (and OS) access to and/or disabling some system technologies (i.e., booting in quarantine mode), updating a model-specific register (e.g., for reporting), initiating recovery (e.g., via out-of-band (OOB) functionality), preventing operation of the BIOS, preventing booting of the OS, halting, shutting down and/or combinations thereof. The particular response(s) may be selected at manufacturing and/or may be selected by updating the processor configuration and/or initialization firmware, as described herein.

The processor complex 102 may include a processor (CPU) 122 and off-die non-volatile memory 124. For example, the off-die non-volatile memory 124 may be included in a processor complex package that includes the processor 122 and the off-die non-volatile memory 124. In another example, the non-volatile memory 124 may be included in the processor 122, e.g., on the same die. The processor 122 may include non-volatile memory 123, processor initialization module 126, initialization firmware verification module 128, pMSRs 132 and/or eMSRs 133. The initialization firmware verification module 128 may be included in the processor initialization module 126 or may be a separate module. The processor initialization module 126 and/or initialization firmware verification module 128 may include microcode, circuitry and/or state information stored in volatile and/or non-volatile memory.

On-die and/or on-package non-volatile memory may include a plurality of non-volatile memory technologies, including, but not limited to, read-only whose content is set at manufacture (e.g., ROMs), factory updatable (e.g., fuses), and/or field-updatable (e.g., fuses, flash). For example, the processor non-volatile memory 123 may be configured to store microcode and/or other persistent processor state information. The off-die non-volatile memory 124 is configured to store initialization firmware 130. The initialization firmware verification module 128 and initialization firmware 130 may typically be generated by a processor manufacturer, and stored during the manufacturing process. The processor complex 102, including initialization firmware verification module 128 and initialization firmware 130, may be relatively secure and generally inaccessible to attacks by malware. The initialization firmware verification module 128 (e.g., including fuses and/or reprogrammable state machines) and initialization firmware 130 may be updated securely using, e.g., cryptographic keys.

At least a portion of processor non-volatile memory 123 may be accessible via one or more model specific registers (MSRs) 132, 133. MSRs may be configured to access and/or control processor configuration. The MSRs may include persistent MSRs ("pMSRs") 132 and/or ephemeral MSRs ("eMSRs") 133. Persistent MSRs 132 are configured to persist across power cycles, i.e., may be considered non-volatile. Ephemeral MSRs 133 are configured to persist only while the system 100 is powered and running, i.e., may be considered volatile. Both pMSRs 132 and eMSRs 133 are configured to expose configuration policy and to report processor 122 state to third parties. For example, MSRs 132, 133 may be used to turn power management functions on or off, to report errors, to report state and/or to turn certain functionality (e.g., hypervisor) on or off. In some embodiments, the eMSRs 133 may be used to report a verification failure. For example, a BIOS_VERIFICATION MSR may be set if the BIOS verification fails. Advantageously, configuring the BIOS_VERIFICATION MSR as an ephemeral MSR 133 allows a BIOS vendor to update the BIOS during an operational life of the computing platform.

Generally, MSRs 132, 133 may be accessed by third party functions using a read MSR (e.g., access state) or write MSR instruction (e.g., change content of MSR). Some of the MSRs 132, 133 may be "immutable" meaning that the contents of the immutable MSRs may not be changed by third party out of band or in-band processor ISA code execution action. For example, the BIOS_VERIFICATION MSR may be immutable. Malware may be unable to change the contents of an immutable MSR so that the immutable MSR may provide a relatively secure channel for reporting the status of, e.g., the BIOS. In one embodiment, MSRs 132, 133 may include a Platform_Update MSR configured to trigger execution of initialization firmware verification module 128 and initialization firmware 130 and their associated verification actions.

For example, Platform_Update MSR may trigger execution when written to with a candidate BIOS firmware update.

The processor complex 102 is configured to execute the processor initialization module 126, including initialization firmware verification module 128, in response to a system 100 reset. The processor complex 102 may be configured to execute the processor initialization module 126 and the initialization firmware verification module 128 based on a model specific register, e.g., Platform_Update MSR. The initialization firmware verification module 128 is configured to verify the initialization firmware 130, as described herein. If the verification of the initialization firmware 130 fails, the initialization firmware verification module 128 may be configured to initiate one or more response(s), as described herein. For example, processor initialization module 126 and initialization firmware verification module 128 may include microcode, circuitry and/or state information stored in volatile and/or non-volatile storage. If the verification of the initialization firmware 130 is successful, the processor complex 102 is configured to execute the initialization firmware 130. In this manner, the initialization firmware may be checked (verified) prior to verifying the BIOS. The method and system described herein is configured to establish a chain of trust, rooted in the processor initialization module 126 and the initialization firmware verification module 128, then extending to initialization firmware 130, and then to BIOS 134.

EEPROM 114 is configured to store BIOS 134, firmware interface table (FIT) 136 and manageability engine (ME) firmware 138. EEPROM 114 is reprogrammable allowing updates to the BIOS 134. The BIOS in 134 may be coupled to network 120 via, e.g., microprocessor subsystem 112 and manageability engine firmware 138 allowing remote programming. For example, EEPROM 114 may be flash memory configured to be reprogrammed locally or remotely. For example, the flash memory may be NOR-type flash memory. NOR flash memory is typically byte-writeable, block erasable, smaller than NAND type flash memory (e.g., 1 Megabytes to 16 Megabytes for NOR versus Gigabytes for NAND) and is typically used for execute-in-place code. EEPROM 114 may be another type of re-programmable, non-volatile storage, including, but not limited to, resistive-based and/or charged-based memories (e.g., ferrite-core memory), Phase Change Memory (PCM), Magnetic-based memory (MRAM), Carbon-Nanotube-based non-volatile memory technologies, etc. Such technologies may be termed "Non-Volatile RAM" or "NVRAM" when they are reprogrammable, and may include write-once storage such as fuses/fuse arrays. Although NOR-flash and flash memories are discussed herein, other non-volatile memory technologies may be employed, consistent with the present disclosure. The particular memory technology used may depend on system requirements and is a design choice.

Figure 2:
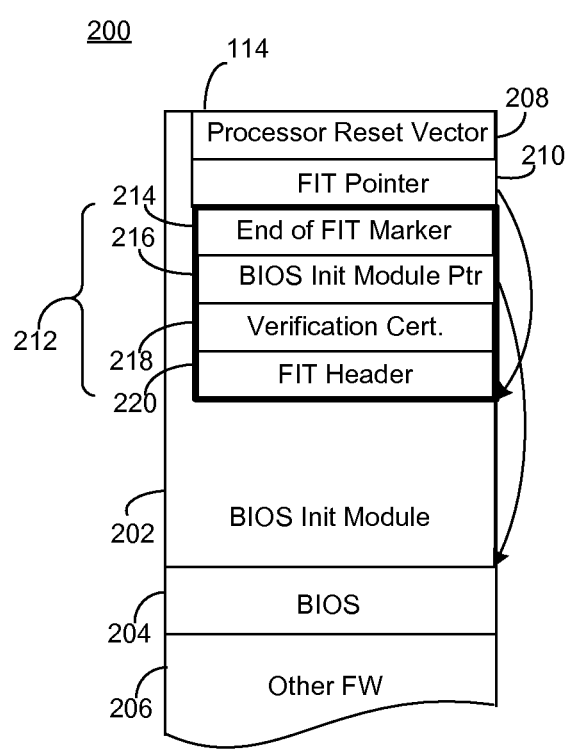
FIG. 2 illustrates an exemplary storage arrangement for information stored in flash memory consistent with one embodiment of the present disclosure.

FIG. 2 illustrates an exemplary storage arrangement 200 for information stored in flash memory 114. The flash may include a BIOS initialization module 202, the BIOS 204 and other firmware 206. The BIOS initialization module 202 may include a processor reset vector 208, a FIT pointer 210 and a FIT structure 212. The FIT structure 212 may include an end-of-FIT marker 214, a BIOS initialization module pointer 216, a verification certificate 218 and/or a FIT header 220. The FIT structure 212 of FIG. 2 corresponds to FIT 136 of FIG. 1 and the BIOS 204 of FIG. 2 corresponds to BIOS 134 of FIG. 1.

The FIT 136 is configured to provide an interface (i.e., pointers) to firmware, including BIOS 134, stored in the flash memory 114. If the FIT 136 is empty or nullified, a processor bootstrap may be configured to revert to a default processor bootstrap or reset vector address. If the FIT 136 is not empty, it may contain a variety of records that are configured to describe executable code and/or data. Such records may contain pointers and other metadata, such as pointers to a block of code/data in the flash memory to be executed in lieu of or in addition to the default reset vector address. The FIT 136, or a similar mechanism, is configured to allow for an alternate specification and/or loading of functionality in lieu of or in addition to default behaviors implemented using the processor's default reset vector 208. This configuration may be useful for system customization and patching purposes. The initialization firmware 130 may determine a location of BIOS 134 in flash 114 using a pointer (e.g., BIOS initialization module pointer 216) in the FIT structure 212. In some embodiments, the initialization firmware 130 may use other techniques, e.g., searching flash 114 and/or platform strapping options, in order to determine the location of the BIOS 134.

The BIOS 134 is configured to initialize and test the hardware and to load the OS 150. Re-programmability allows the BIOS 134 to be updated (without replacing the EEPROM 114) but also provides an avenue for attack by malicious programs. Malicious programs that may have compromised the BIOS 134 typically execute at a relatively high privilege level so are difficult to detect by conventional anti-malware programs. Advantageously, the initialization firmware verification module 128 and initialization firmware 130 consistent with the present disclosure are configured to execute prior to the processor 122 fetching and/or executing the BIOS 134 code, and may therefore detect a compromised BIOS prior to its execution. If the BIOS 134 is compromised (i.e., verification fails), the initialization firmware 130 is configured to initiate one or more responses, described herein. For example, in response to detection of a compromised system, an alternate FIT entry may be configured to point to a recovery BIOS block in storage structure 200 in EEPROM 114. In another example, the EEPROM 114 may include a duplicate of BIOS 134 stored in a separate region of EEPROM 114 (or another, distinct EEPROM) that may be accessed (decoded) in response to detection of a compromised system. In other words, system 100 may include a "backup" BIOS configured to be executed if verification of BIOS 134 fails. The backup BIOS may be stored in EEPROM 114 and/or another EEPROM.

Turning again to FIG. 1, microprocessor subsystem 112 may include an embedded microprocessor 140, cache memory 142 and non-volatile memory (ROM) 144. The microprocessor subsystem 112 is configured to execute manageability engine firmware 138 stored in flash memory 114. In this embodiment, the microprocessor subsystem 112 is coupled to the processor complex 102 via the Platform Controller Hub (PCH) 106 and to the network 120 and remote agent 118 via the network port 116. The microprocessor subsystem 112 is configured to provide out-of-band communication. The out-of-band communication may be between microprocessor subsystem 112 and processor complex 102 and/or between system 100 and remote agent 118. For example, if verification of BIOS 134 fails, the microprocessor subsystem 112 (and manageability engine firmware 138) may be configured to communicate OOB with remote agent 118 to retrieve an updated, verified BIOS from remote agent 118. Advantageously, this may allow remotely updating and/or authenticating the BIOS stored in a flash memory that has been attacked without requiring actual on-site physical access to the flash memory 114.

Thus, in response to a reset (e.g., associated with a power on and/or based on a state of a model-specific register), system 100 is configured to run the processor initialization module 126 to perform an initialization sequence (i.e., processor 122 initialization phase) and initialization firmware verification module 128 configured to verify initialization firmware 130 included in processor complex 102. System 100 is further configured to execute initialization firmware 130 to verify BIOS 134. If verification of initialization firmware 130 and/or BIOS 134 fails, system 100 is further configured to initiate one or more responses including, but not limited to, configuring the system (computing platform) to boot in quarantine mode with limited functionality, initiating a recovery process (e.g., via OOB functionality), reporting verification status using one or more MSRs, preventing the initialization firmware and/or BIOS from executing, shutting down and/or stopping the processor. Advantageously, unlike BIOS 134, the processor initialization module 126, initialization firmware verification module 128 and initialization firmware 130, included in processor complex 102, are relatively inaccessible (e.g., they are on-die or on processor package substrate) and generally do not include a published interface protocol. This configuration of processor initialization module 126, initialization firmware verification module 128, initialization firmware 130 and processor complex 102 provide a "root of trust" from which BIOS 134 may be verified.

Exemplary Methodology

Figure 3:
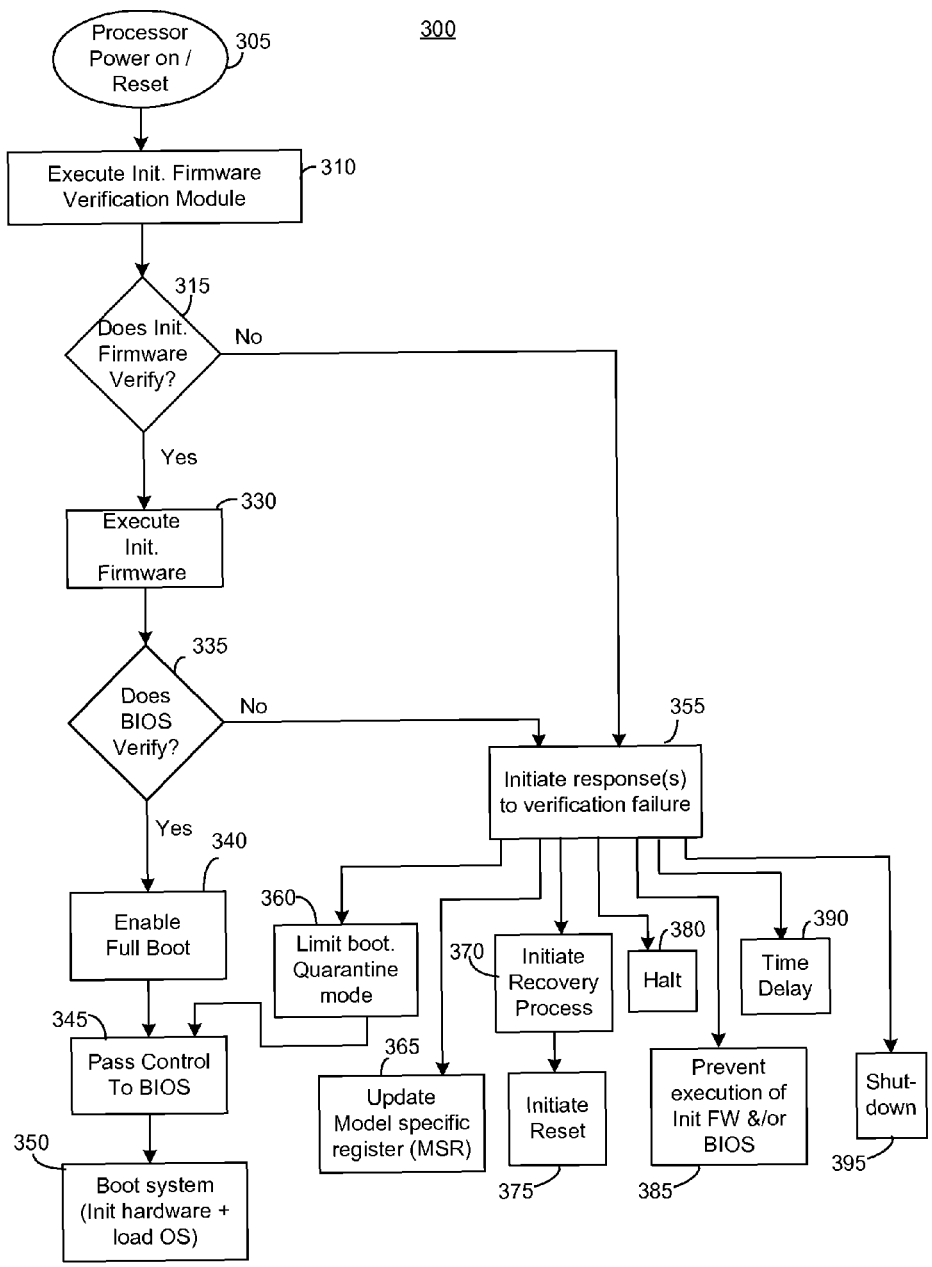
FIG. 3 illustrates a flow chart of exemplary operations for verifying a BIOS consistent with the present disclosure.

FIG. 3 illustrates a flow chart 300 of exemplary operations for verifying (authenticating) a BIOS consistent with the present disclosure. The operations illustrated in this embodiment may be performed by circuitry, firmware and/or software modules associated with system 100 (e.g., processor complex 102 including CPU 122). Procedure flow may begin at operation 305. Operation 305 includes a reset, e.g., a power-on reset or a CPU-only reset. Operation 310 includes executing a processor initialization module. Operation 310 includes executing an initialization firmware verification module and may include other processor activities associated with powering on. Whether initialization firmware verifies (i.e., passes verification) may be determined at operation 315.

If the initialization firmware verifies, the initialization firmware may be executed at operation 330. Whether the BIOS verifies may be determined at operation 335. If the BIOS verifies, a full system boot may be enabled at operation 340. For example, verification may include one or more BIOS elements along a default reset vector path or alternate FIT-specified paths or modules. A full system boot means that all system functionality may be available to a BIOS and an OS. Operation 345 may include passing control to the BIOS. For example, the initialization firmware 130 may pass control of system 100 to BIOS 134. Operation 350 may include booting the system including initializing system hardware and loading the OS.

If the initialization firmware does not verify and/or the BIOS does not verify (i.e., fails verification), one or more response(s) may be initiated at operation 355. The initialization firmware verification module 128 may be configured to select and initiate these response(s) if the initialization firmware fails verification. The initialization firmware 130 may be configured to select and initiate these response(s) if the BIOS fails verification. The response(s) may include one or more of operations 360, 365, 370 (and 375), 380, 385, 390 and 395. Operation 380 includes halting. For example, processor 122 may be halted at operation 380. Operation 385 includes preventing execution of the initialization firmware and/or the BIOS. The system (e.g., system 100) may be shut down at operation 395.

Operation 360 includes booting the system in quarantine mode (i.e., a restricted or limited operational mode). In quarantine mode, some system functionality and/or access to some system components may be disabled. Quarantine mode is configured to allow limited system functionality when the initialization firmware and/or BIOS fails verification. For example, "higher" system functions such as a hypervisor may be disabled. Operation 365 includes updating a model specific register (MSR). The update of the model specific register may be configured to communicate the initialization firmware and/or BIOS verification failure. The model specific register may be immutable so that it may not be changed by third parties providing a relatively secure reporting method. For example, the MSR may be updated to communicate the failure without communicating details of the failure condition. This limited reporting is configured to prevent an attacker from compromising detection functionality using details of the failure condition.

A recovery process may be initiated at operation 370. Operation 370 may include maintaining a cross-reset state configured to allow an initial retry that includes a reset, rolling over to a backup copy of the initialization firmware and/or BIOS, rolling back to a prior image of the initialization firmware and/or BIOS and/or updating the initialization firmware and/or BIOS. Whether a backup copy of the initialization firmware is present may depend on properties associated with non-volatile memory. A number of retries in operation 370 may be limited. For example, a counter may be implemented that is configured to trigger an exit from the recovery process if the number of retries reaches a predetermined value. In another example, a roll over or roll back may result in a modification of a persistent state so that a subsequent retry may trigger an exit from the recovery process. The initialization firmware and/or BIOS may be updated using secure (i.e., cryptographic) techniques.

Operation 370 may include updating the initialization firmware and/or BIOS via Out Of Band (OOB) communications. For example, the microprocessor subsystem 112 of FIG. 1 may be configured to communicate over network 120 to remote agent 118 via OOB communication to retrieve an updated, uncompromised BIOS. For example, the updated BIOS may have a higher monotonic revision than the failed BIOS (e.g., to avoid roll-back attacks to earlier, possibly errant BIOS's). The microprocessor subsystem 112 may be further configured to reprogram the flash memory 114 with the retrieved BIOS. A reset may then be initiated at operation 375.

Operation 390 may include implementing a time delay. For example, a time delay may be inserted between responses. In another example, a time delay may be inserted between retries in operation 370. The time delay(s) are configured to reduce a rate of attacks and a rate at which an attack may be evaluated as a success or a failure.

The responses described by operations 360, 365, 370, 375, 380, 385, 390 and 395 may be performed individually or in combination. The particular response(s) may be predetermined and stored, e.g., in off-die non-volatile memory 124. For example, the responses may be selected at various times and using various methods including, but not limited to, at manufacturing, at initial operation, by jumpers, by special, protected user initial setup, and/or by updating the initialization firmware verification module and/or initialization firmware.

Thus, as illustrated in flow chart 300, the processor initialization module and initialization firmware verification module may be configured to execute prior to the initialization firmware and the BIOS in order to verify the initialization firmware and the BIOS. If the initialization firmware and/or the BIOS fails verification, one or more responses may be initiated. Advantageously, some of the responses are configured to allow system, e.g., system 100, to operate in a quarantine mode, to update the initialization firmware and/or the BIOS and/or to communicate the initialization firmware and/or the BIOS verification failure. Accordingly, response to a BIOS verification failure is not limited to stopping the system 100.

Figure 4:
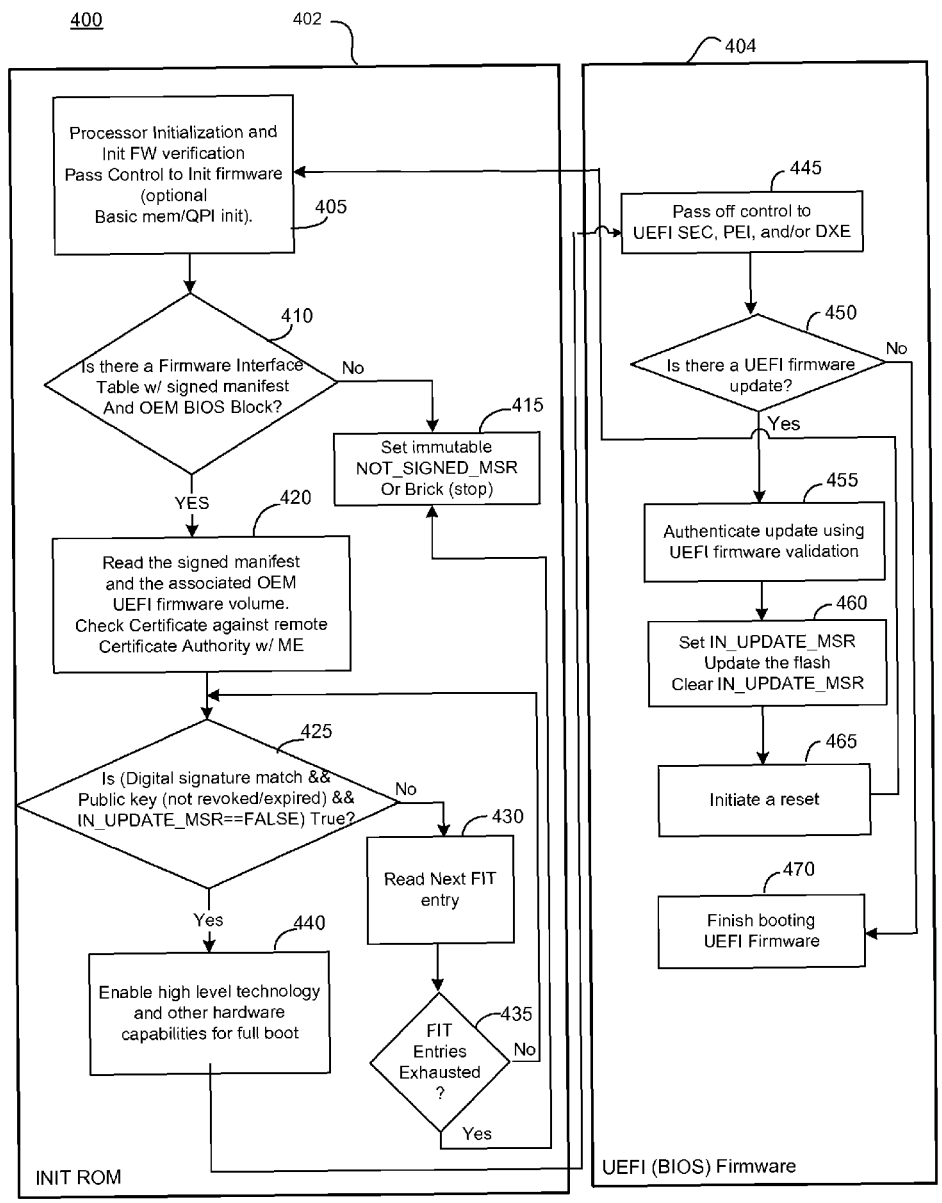
FIG. 4 illustrates another flow chart of exemplary operations for verifying a BIOS consistent with the present disclosure.

FIG. 4 illustrates another flow chart 400 of exemplary operations for verifying a BIOS consistent with the present disclosure. The operations illustrated in this embodiment may be performed by circuitry, firmware and/or software modules associated with system 100 (e.g., processor complex 102 including CPU 122). In FIG. 4, operations associated with verifying the BIOS are included in Init ROM 402 corresponding to Init ROM 127 of FIG. 1 and operations associated with the BIOS are included in UEFI (BIOS) firmware 404 corresponding to BIOS 134.

Program flow may begin at operation 405. Operation 405 may be performed in response to a system reset. Operation 405 may include execution of the processor initialization module, including the initialization firmware verification module and its verification of initialization firmware, and execution of initialization firmware. If the initialization firmware verification module successfully verifies the initialization firmware, the processor may commence execution of the initialization firmware. Operation 405 may optionally include initializing basic memory functions (e.g. establishing system memory) and/or initializing other system elements such as interconnect fabric. A Quick Path Interface is one example of an interconnect fabric that may be configured to interconnect a processor subsystem with a platform controller hub and/or a microprocessor subsystem. Operation 410 includes determining whether there is a firmware interface table (FIT) with a signed manifest and an OEM BIOS block in flash memory. For example, in systems that include TPM 108, operation 410 may include confirming the integrity of the signed manifest by comparing a hash of the manifest to a stored hash value in an NV data register of TPM 108.

If there is not a firmware interface table (FIT) with a signed manifest or there is not an OEM BIOS block in flash memory, operation 415 may be performed. Operation 415 includes setting an immutable model specific register (NOT_SIGNED_MSR) and/or halting the processor subsystem. If there is a FIT with a signed manifest and an OEM BIOS block in flash memory, operation 420 may be performed. Operation 420 includes reading the signed manifest and associated OEM UEFI BIOS firmware volume. Operation 420 may further include verifying the signed manifest (digital signature) with a remote certificate authority (CA). For example, verifying the signed manifest may be performed OOB using the microprocessor subsystem 112 and manageability engine firmware 138.

Whether the digital signature matches and an associated public key has not been revoked and is not expired and an IN_UPDATE_MSR model specific register is FALSE may be determined at operation 425. If not, a next entry in the FIT may be read at operation 430. Whether the FIT entries have been exhausted may be determined at operation 435. If the FIT entries have been exhausted (i.e., no untested entries in the FIT), operation 415 may be performed. If the digital signature matches and an associated public key has not been revoked and is not expired and an IN_UPDATE_MSR model specific register is FALSE, full boot may be enabled at operation 440. Full boot may include enabling high level technology and other hardware capabilities.

Operation 445 may include passing control to UEFI BIOS firmware that may include a security phase (SEC), a platform environment initialization phase (PEI) and/or a driver execution environment (DXE). Whether there is a UEFI firmware update may be determined at operation 450. If there is a UEFI firmware update, the update may be authenticated using UEFI firmware validation at operation 455. Operation 460 includes setting a model specific register IN_UPDATE_MSR, updating the UEFI firmware in the flash memory and clearing the model specific register IN_UPDATE_MSR. A reset may then be initiated at operation 465. If there is not a UEFI firmware update, UEFI BIOS firmware may finish booting at operation 470.

Figure 5:
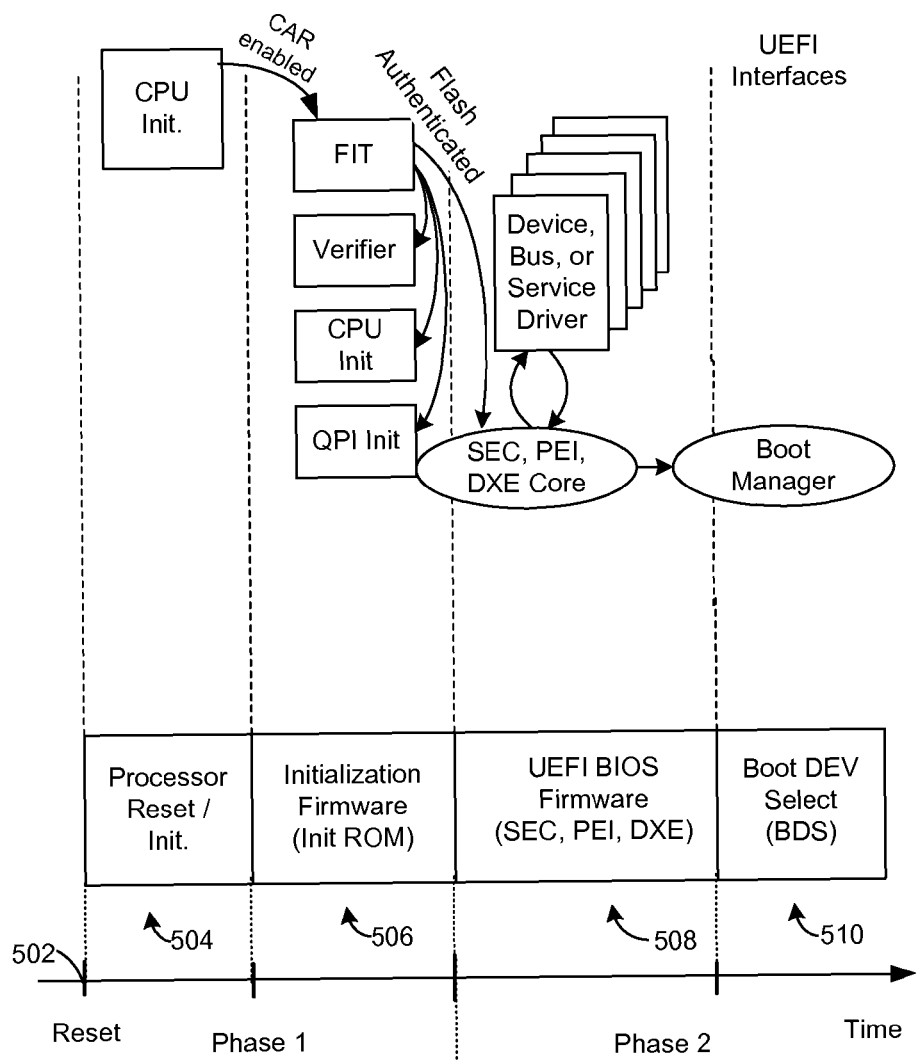
FIG. 5 is a graphical illustration of operations associated with a boot process from a reset to OS boot consistent with one embodiment of the present disclosure.

FIG. 5 is a graphical illustration of operations associated with a boot process 500 from a reset to OS boot. The boot process 500 of FIG. 5 corresponds to successful verification of BIOS firmware as described herein. The process 500 may include two phases (phase 1 and phase 2) and a plurality of sub-phases. The process 500 may be initiated with a reset (e.g., power-on or CPU-only) 502. In response to the reset, a processor initialization module, including a initialization firmware verification module, may be executed as described herein, during sub-phase 504. The initialization firmware verification module may be configured to locate the FIT and to authenticate the initialization firmware as described herein. The initialization firmware may then verify OEM BIOS and/or enable interconnect fabric (e.g. QPI) and system memory as described herein during sub-phase 506. Sub-phase 504 and sub-phase 506 are included in Phase 1. Phase 1 operations may be performed by processor initialization module and initialization firmware and may therefore be relatively secure. The UEFI BIOS firmware may then initialize the platform (e.g., system 100), including SEC, PEI and DXE during sub-phase 508. The SEC establishes a temporary memory store, including but not limited to using a processor Cache As RAM (CAR) in order to execute the PEI core and the PEI modules. When DXE commences, initialized memory should be available. The DXE may include PCI, UI, USB, I/O, legacy BIOS, SMBIOS and/or ACPI. The process may end with sub-phase 510, Boot Device Select which corresponds to initiating boot of the operating system. Sub-phase 508 and sub-phase 510 are included in Phase 2. Phase 1 includes initialization firmware verification and BIOS verification. Phase 2 includes launch and execution of verified UEFI BIOS firmware and Boot device select.

Generally, this disclosure provides systems (and methods) for BIOS storage attack protection and notification. One example system includes a processor initialization module that may include processor control and/or data state stored in a processor non-volatile memory and initialization firmware stored in non-volatile memory in a processor package, coupled to the processor. The processor initialization module, including the initialization firmware verification module, is configured to execute first in response to a reset and the initialization firmware verification module is configured to verify the initialization firmware. The initialization firmware is configured to execute after verification by the initialization firmware verification module and, in turn, is configured to verify the BIOS. If the verification of the initialization firmware and/or the BIOS fails, the system is configured to at least one of: prevent the initialization firmware and/or BIOS from executing, initiate recovery (e.g., using out-of-band (OOB) communication), report the verification failure using a model-specific register (MSR), halt the processor, shut down and/or allow the BIOS to execute and an operating system (OS) to boot in a limited functionality ("quarantine") mode. In the quarantine mode, some functionality of the system may be made unavailable to the BIOS and OS.

"Circuitry", as used in any embodiment herein, may comprise, for example, singly or in any combination, hardwired circuitry, programmable circuitry, state machine circuitry, embedded controllers, and/or firmware that stores instructions executed by programmable circuitry.

The OS 150 may include any general purpose or custom operating system. For example, the OS 150 may be implemented using Microsoft Windows, HP-UX, Linux, or UNIX, and/or other general purpose operating system.

While FIGS. 3, 4 and 5 illustrate methods according various embodiments, it is to be understood that in any embodiment not all of these operations are necessary. Indeed, it is fully contemplated herein that in other embodiments of the present disclosure, the operations depicted in FIGS. 3, 4 and/or 5 may be combined in a manner not specifically shown in any of the drawings, but still fully consistent with the present disclosure. Thus, claims directed to features and/or operations that are not exactly shown in one drawing are deemed within the scope and content of the present disclosure.

Embodiments described herein may be implemented using hardware, software, and/or firmware, for example, to perform the methods and/or operations described herein. Certain embodiments described herein may be provided as a tangible machine-readable medium storing machine-executable instructions that, if executed by a machine, cause the machine to perform the methods and/or operations described herein. The tangible machine-readable medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of tangible media suitable for storing electronic instructions. The machine may include any suitable processing platform, device or system, computing platform, device or system and may be implemented using any suitable combination of hardware and/or software. The instructions may include any suitable type of code and may be implemented using any suitable programming language.

Thus, in one embodiment the present disclosure provides a method for verifying a basic input/output system (BIOS) of a computing platform. The method includes executing a processor initialization module in response to a reset, wherein the processor initialization module is included in a processor in the computing platform and the processor initialization module comprises an initialization firmware verification module; attempting to verify initialization firmware stored in non-volatile memory in a processor package in the computing platform using the initialization firmware verification module; attempting to verify the BIOS using the initialization firmware wherein the BIOS is included in a reprogrammable non-volatile memory; and initiating at least one response if at least one of the initialization firmware and the BIOS fails to verify.

In another embodiment, the present disclosure provides a computing platform. The computing platform includes a processor package including: a processor comprising processor initialization module wherein the processor initialization module comprises an initialization firmware verification module, and an off-die non-volatile memory having initialization firmware stored therein. The computing platform further includes a reprogrammable non-volatile memory having basic input/output system (BIOS) firmware stored therein. The processor is configured to: execute the processor initialization module in response to a reset of the computing platform, attempt to verify the initialization firmware using the initialization firmware verification module, attempt to verify the BIOS firmware using the initialization firmware and initiate at least one response if at least one of the initialization firmware and the BIOS firmware fails verification.

In another embodiment, the present disclosure provides a tangible computer-readable medium including instructions stored thereon which, when executed by one or more processors, cause the one or more processors to perform operations that include executing a processor initialization module in response to a reset, wherein the processor initialization module is included in a processor in the computing platform and the processor initialization module comprises an initialization firmware verification module; attempting to verify initialization firmware stored in non-volatile memory in a processor package in the computing platform using the initialization firmware verification module; attempting to verify the BIOS using the initialization firmware wherein the BIOS is included in a reprogrammable non-volatile memory; and initiating at least one response if at least one of the initialization firmware and the BIOS fails to verify.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A method for verifying a basic input/output system (BIOS) of a computing platform, the method comprising:
   executing a processor initialization module in response to a reset, wherein the processor initialization module is included in a processor in the computing platform and the processor initialization module comprises an initialization firmware verification module;
   attempting to verify initialization firmware stored in non-volatile memory in a processor package in the computing platform using the initialization firmware verification module;
   attempting to verify the BIOS using the initialization firmware wherein the BIOS is included in a reprogrammable non-volatile memory; and
   initiating at least one response if at least one of the initialization firmware and the BIOS fails to verify.

2. The method of claim 1, further comprising passing control of the computing platform to the BIOS, wherein the at least one response comprises configuring the computing platform for operation in quarantine mode with limited platform functionality.

3. The method of claim 1, wherein the at least one response is selected from a plurality of responses comprising preventing the initialization firmware from executing, preventing the BIOS from executing, initiating recovery, reporting the verification failure using a model-specific register, halting the processor, shutting down the computing platform and configuring the computing platform for operation in quarantine mode with limited platform functionality.

4. The method of claim 1, further comprising updating the initialization firmware in response to a verification failure of the initialization firmware.

5. The method of claim 1, wherein the at least one response comprises updating the BIOS over a network using out-of-band communication via a microprocessor subsystem of the computing platform.

6. The method of claim 1, further comprising triggering execution of the initialization firmware verification module and the initialization firmware in response to writing a candidate BIOS firmware update to a model-specific register.

7. A computing platform comprising:
a processor package comprising:
   a processor comprising processor initialization module wherein the processor initialization module comprises an initialization firmware verification module, and
   an off-die non-volatile memory having initialization firmware stored therein; and
a reprogrammable non-volatile memory having basic input/output system (BIOS) firmware stored therein;
the processor configured to:
   execute the processor initialization module in response to a reset of the computing platform,
   attempt to verify the initialization firmware using the initialization firmware verification module,
   attempt to verify the BIOS firmware using the initialization firmware and
   initiate at least one response if at least one of the initialization firmware and the BIOS firmware fails verification.

8. The computing platform of claim 7, wherein the processor is further configured to pass control of the computing platform to the BIOS and the at least one response comprises configuring the computing platform for operation in quarantine mode with limited platform functionality.

9. The computing platform of claim 7, wherein the at least one response is selected from a plurality of responses comprising preventing the initialization firmware from executing, preventing the BIOS from executing, initiating recovery, reporting the verification failure using a model-specific register, halting the processor, shutting down the computing platform and configuring the computing platform for operation in quarantine mode with limited platform functionality.

10. The computing platform of claim 7, wherein the processor is further configured to update the initialization firmware in response to a verification failure of the initialization firmware.

11. The computing platform of claim 7, further comprising a microprocessor subsystem configured to update the BIOS firmware over a network using out-of-band communication.

12. The computing platform of claim 7, further comprising a model-specific register wherein the processor is configured to execute the initialization firmware verification module and the initialization firmware in response to a candidate BIOS firmware being written to the model-specific register.

13. A non-transitory computer-readable medium including instructions stored thereon which, when executed by one or more processors, cause the one or more processors to perform operations comprising:
   executing processor initialization module in response to a reset, wherein the processor initialization module is included in a processor in a computing platform and the processor initialization module comprises an initialization firmware verification module;
   attempting to verify, using the initialization firmware verification module, initialization firmware configured to be stored in non-volatile memory in a processor package in the computing platform;
   attempting to verify the BIOS using the initialization firmware wherein the BIOS is configured to be included in a reprogrammable non-volatile memory; and
   initiating at least one response if at least one of the initialization firmware and the BIOS fails to verify.

14. The computer readable medium of claim 13, wherein the operations further comprise passing control of the computing platform to the BIOS, wherein the at least one response comprises configuring the computing platform for operation in quarantine mode with limited platform functionality.

15. The computer readable medium of claim 13, wherein the at least one response is selected from a plurality of responses comprising preventing the initialization firmware from executing, preventing the BIOS from executing, initiating recovery, reporting the verification failure using a model-specific register, halting the processor, shutting down the computing platform and configuring the computing platform for operation in quarantine mode with limited platform functionality.

16. The computer readable medium of claim 13, wherein the operations further comprise updating the initialization firmware in response to a verification failure of the initialization firmware.

17. The computer readable medium of claim 13, wherein said at least one response comprises updating the BIOS over a network using out-of-band communication via a microprocessor subsystem of the computing platform.

18. The computer readable medium of claim 13, wherein the operations further comprise triggering execution of the initialization firmware verification module and the initialization firmware in response to writing a candidate BIOS firmware update to a model-specific register.

* * * * *